United States Patent
Nedachi et al.

(10) Patent No.: US 9,874,277 B2
(45) Date of Patent: Jan. 23, 2018

(54) TRANSMISSION SYSTEM OF VEHICLE

(71) Applicant: HONDA MOTOR CO., LTD., Tokyo (JP)

(72) Inventors: Yoshiaki Nedachi, Wako (JP); Junya Ono, Wako (JP); Tatsuya Ryuzaki, Wako (JP); Yoshinobu Shiomi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 187 days.

(21) Appl. No.: 14/864,771

(22) Filed: Sep. 24, 2015

(65) Prior Publication Data

US 2016/0090092 A1 Mar. 31, 2016

(30) Foreign Application Priority Data

Sep. 30, 2014 (JP) .................. 2014-200443

(51) Int. Cl.
*F16H 63/50* (2006.01)
*F16H 61/02* (2006.01)
*F16H 3/091* (2006.01)
*F16H 59/24* (2006.01)
*F16H 59/36* (2006.01)

(52) U.S. Cl.
CPC ......... *F16H 61/0213* (2013.01); *F16H 3/091* (2013.01); *F16H 59/24* (2013.01); *F16H 63/502* (2013.01); *F16H 2059/366* (2013.01); *F16H 2063/504* (2013.01)

(58) Field of Classification Search
CPC .................................................. F16H 63/502
See application file for complete search history.

(56) References Cited

U.S. PATENT DOCUMENTS

| 2007/0219048 A1* | 9/2007 | Yamaguchi ....... F16H 61/66259 477/109 |
| 2008/0099266 A1* | 5/2008 | Hiroi ................... B60W 10/02 180/219 |
| 2011/0112743 A1* | 5/2011 | Ahn ....................... F02D 11/105 701/103 |
| 2016/0153379 A1* | 6/2016 | Takaoka ................ F02D 41/062 701/113 |

FOREIGN PATENT DOCUMENTS

| JP | 2008240561 A | * 10/2008 | ............ F16H 61/08 |
| JP | 2013-228079 |   11/2013 | |

* cited by examiner

*Primary Examiner* — Tisha Lewis

(74) *Attorney, Agent, or Firm* — Mori & Ward, LLP

(57) ABSTRACT

A transmission system of a vehicle includes a starting clutch, a change clutch, a stepped transmission, a single spindle, a gear position sensor, an actuator, and a transmission controller. The change clutch and the stepped transmission are operated via the single spindle. The gear position sensor is to detect a shift stage of the stepped transmission. The actuator is to rotate the single spindle. The transmission controller, in a case where an engine is started in a state in which the shift stage of the stepped transmission is set in second gear or higher, is configured to control the actuator to carry out shift-down operation and configured to limit output of the engine so that an engine rotation speed becomes a value smaller than a predetermined value until the shift stage of the stepped transmission is set in neutral or first gear.

9 Claims, 8 Drawing Sheets

TRANSMISSION SYSTEM OF VEHICLE

CROSS-REFERENCE TO RELATED APPLICATIONS

The present application claims priority under 35 U. S. C. §119 to Japanese Patent Application No. 2014-200443, filed Sep. 30, 2014. The contents of this application are incorporated herein by reference in their entirety.

BACKGROUND OF THE INVENTION

Field of the Invention

The present invention relates to a transmission system of a vehicle.

Discussion of the Background

As a related art, a motorcycle equipped with a transmission as a so-called AMT (automated manual transmission) that carries out gearshift operation by electric power is disclosed. Specifically, a power unit of the related art includes an engine, a starting clutch that transmits an engine driving force to the downstream side when the engine rotation speed becomes a predetermined value or higher, a change clutch on the downstream side of the starting clutch, and a stepped transmission having a main shaft to which the rotation of the change clutch is transmitted and a countershaft. A transmission mechanism of a so-called interlocking spindle type is employed in which the change clutch and the transmission are operated by a clutch lever and a master arm, respectively, provided on a single (the same) spindle. At the time of shift-down, when the spindle rotates in a shift-down direction, first the clutch lever pivots and the change clutch is disconnected. Then, the master arm pivots and the shift stage of the transmission is moved to the lower stage by one stage. Thereafter, the spindle rotates in such a direction as to return to the initial position and the clutch is connected.

In the case of the vehicle with the AMT, when the vehicle is powered off in the state in which the gear position is second or higher (in-gear state) in driving, the engine is started in the in-gear state at second or higher at the time of the next engine starting. At this time, in order to ensure sufficient starting torque in the starting, a transmission control system automatically carries out shift-down operation to neutral (or first) when the engine is started (or power supply is activated).

Here, in the case of a vehicle with the AMT including a system to operate the change clutch and the shift separately, even when starting operation (accelerator operation) or the like from the driver is made immediately after starting in the in-gear state at second or higher, starting in a state in which the torque is low can be prevented if starting control is not carried out and the change clutch is not connected until the transmission is shifted to neutral (or first). See Japanese Patent Laid-Open No. 2013-228079.

SUMMARY OF THE INVENTION

According to one aspect of the present invention, a transmission system of a vehicle including a power unit having an engine, a starting clutch that transmits an engine driving force to a downstream side when an engine rotation speed becomes a predetermined value or higher, a change clutch on the downstream side of the starting clutch, a stepped transmission having a main shaft to which rotation of the change clutch is transmitted and a countershaft, and a single spindle that operates the change clutch and the transmission, and further including a gear position sensor that detects a shift stage of the transmission, an actuator that drives the spindle, and a transmission control system that operates the actuator, is characterized in that when the engine is started in a state in which the transmission is in second gear or higher, the actuator is driven to carry out shift-down operation and output of the engine is limited to a value smaller than the predetermined value until a gear position of the transmission is set neutral or first.

According to another aspect of the present invention, a transmission system of a vehicle including a power unit having an engine, a starting clutch that transmits an engine driving force to a downstream side when an engine rotation speed becomes a predetermined value or higher, a change clutch on the downstream side of the starting clutch, a stepped transmission having a main shaft to which rotation of the change clutch is transmitted and a countershaft, and a single spindle that operates the change clutch and the transmission, and further including a gear position sensor that detects a shift stage of the transmission, an actuator that drives the spindle, a transmission control system that operates the actuator, and a throttle position sensor that detects a throttle opening of an intake pipe of the engine or a rotation speed sensor that detects the engine rotation speed, is characterized in that when the engine is started in a state in which the transmission is in second gear or higher, the actuator is driven to carry out shift-down operation if the throttle opening or the engine rotation speed does not reach a throttle opening threshold or a rotation speed threshold, and engine torque-down control to limit output of the engine to a value smaller than the predetermined value is carried out if the throttle opening or the engine rotation speed reaches the throttle opening threshold or the rotation speed threshold, and in a period of engine torque-down by the engine torque-down control, shift-down is continued if the spindle is currently rotating due to shift-down operation, and shift-down is prohibited if shift-down operation is not currently being carried out.

According to further aspect of the present invention, a transmission system of a vehicle includes a starting clutch, a change clutch, a stepped transmission, a single spindle, a gear position sensor, an actuator, and a transmission controller. The starting clutch is to transmit an engine driving force from an engine to a downstream side in a case where an engine rotation speed of the engine becomes a predetermined value or higher. The change clutch is provided on the downstream side of the starting clutch. The stepped transmission includes a main shaft and a countershaft. An engine driving force from the change clutch is transmitted to the main shaft. The countershaft is to output an engine driving force from the main shaft. The change clutch and the stepped transmission are operated via the single spindle. The gear position sensor is to detect a shift stage of the stepped transmission. The actuator is to rotate the single spindle. The transmission controller, in a case where the engine is started in a state in which the shift stage of the stepped transmission is set in second gear or higher, is configured to control the actuator to carry out shift-down operation and configured to limit output of the engine so that the engine rotation speed becomes a value smaller than the predetermined value until the shift stage of the stepped transmission is set in neutral or first gear.

According to the other aspect of the present invention, a transmission system of a vehicle includes a starting clutch, a change clutch, a stepped transmission, a single spindle, a gear position sensor, an actuator, a throttle position sensor or a rotation speed sensor, and a transmission controller. The starting clutch is to transmit an engine driving force from an engine to a downstream side in a case where an engine rotation speed of the engine becomes a predetermined value or higher. The change clutch is provided on the downstream side of the starting clutch. The stepped transmission includes a main shaft and a countershaft. An engine driving force from the change clutch is transmitted to the main shaft. The countershaft is to output an engine driving force from the main shaft. The change clutch and the stepped transmission are operated via the single spindle. The gear position sensor is to detect a shift stage of the stepped transmission. The actuator is to rotate the single spindle. The throttle position sensor is to detect a throttle opening of an intake pipe of the engine or the rotation speed sensor is to detect the engine rotation speed. The transmission controller, in a case where the engine is started in a state in which the shift stage of the stepped transmission is set in second gear or higher, is configured to control the actuator to carry out shift-down operation if the throttle opening or the engine rotation speed does not reach a throttle opening threshold or a rotation speed threshold and configured to carry out engine torque-down control to limit output of the engine so that the engine rotation speed becomes a value smaller than the predetermined value if the throttle opening or the engine rotation speed reaches the throttle opening threshold or the rotation speed threshold. The transmission controller, in a period of engine torque-down due to the engine torque-down control, is configured to continue shift-down due to the shift-down operation if the single spindle is currently rotating due to the shift-down operation and configured to prohibit the shift-down if the shift-down operation is not currently being carried out.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
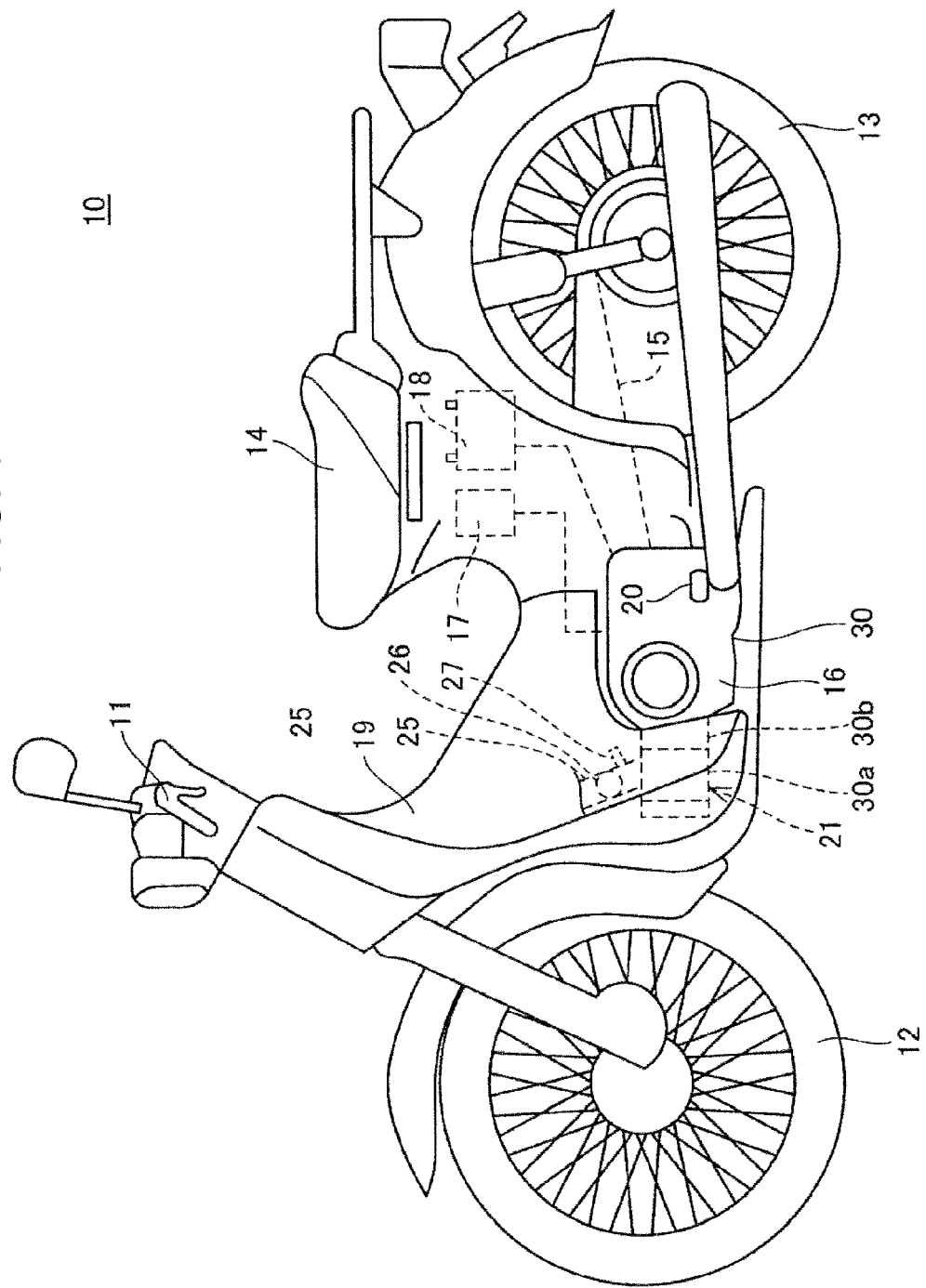
FIG. 1 is a left side view of a motorcycle including a transmission system according to a first embodiment of the present invention.

The embodiments will now be described with reference to the accompanying drawings, wherein like reference numerals designate corresponding or identical elements throughout the various drawings.

One embodiment of the present invention will be described below with reference to the drawings.

First Embodiment

FIG. 1 is a left side view of a motorcycle 10 including a transmission system according to a first embodiment of the present invention.

The motorcycle 10 has a handlebar 11 pivotally supported by a head pipe (not shown) rotatably, a front wheel 12 steered by the handlebar 11, a rear wheel 13 as a drive wheel, a seat 14 on which a driver sits, a power unit 16 that supplies a driving force to the rear wheel 13 via a chain 15, a control unit 17 (transmission control system) that controls the power unit 16, and a battery 18.

The motorcycle 10 is formed based on a vehicle body frame (not shown) and this vehicle body frame is covered by a vehicle body cover 19. The control unit 17 and the battery 18 are disposed below the seat 14 and inside the vehicle body cover 19. The power unit 16 is provided at substantially the middle between the front wheel 12 and the rear wheel 13 and on the lower side and somewhat front side of the seat 14. A pair of left and right steps 20 for the driver are provided at the lower part of the power unit 16.

An intake pipe 25 extending from an air cleaner box (not shown) is connected to an intake port of a cylinder head 30a of an engine 21. The intake pipe 25 is provided with an electronically-controlled throttle valve 26 that regulates the amount of air supplied to the engine 21. A fuel injection valve 27 is provided on the downstream side of the throttle valve 26 in the intake pipe 25.

Figure 2:
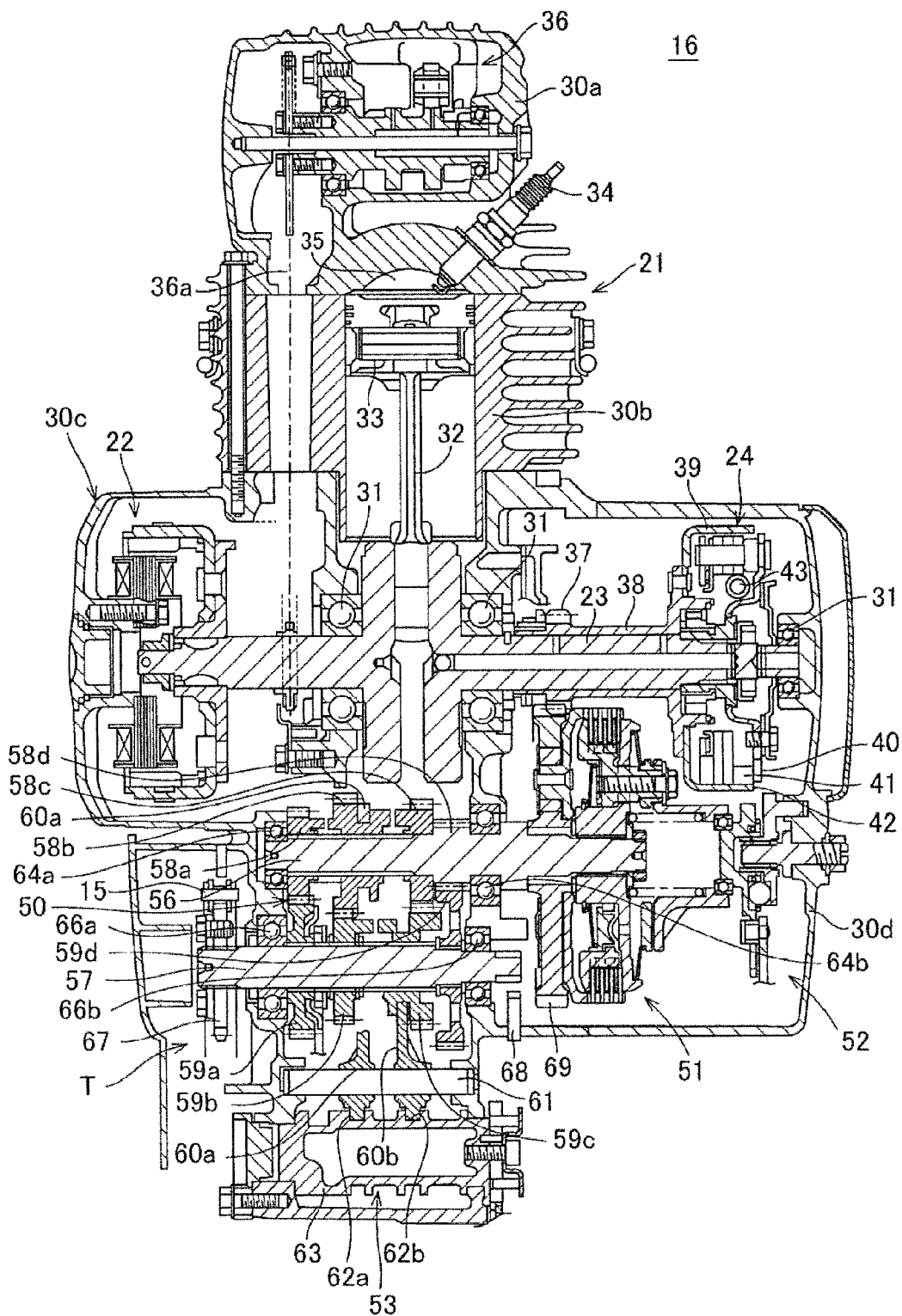
FIG. 2 is a sectional plan view of a power unit.

The power unit 16 includes an automatic transmission system T (FIG. 2). The automatic transmission system T (transmission system) includes a transmission 50 in which connection and disconnection operation of a clutch is automated. In this automatic transmission system T, switching of a change clutch 51 and switching of the shift stage (shift) are automatically carried out.

Next, the configuration of the power unit 16 will be described.

FIG. 2 is a sectional plan view of the power unit 16. In FIG. 2, the left-right direction corresponds to the vehicle width direction. The upward direction corresponds to the vehicle front direction and the downward direction corresponds to the vehicle rear direction.

The power unit 16 includes the engine 21 that generates a travel driving force, an electric generator 22, a starting clutch 24 provided on a crankshaft 23 of the engine 21, and the automatic transmission system T that outputs, through gearshift, the driving force of the crankshaft 23 output via the starting clutch 24.

The power unit 16 is formed by integrally joining the cylinder head 30a, a cylinder 30b, and a crankcase 30c. The crankshaft 23 is rotatably supported by plural bearings 31. The engine 21 has a piston 33 joined to the crankshaft 23 with the intermediary of a connecting rode 32, an ignition plug 34, and a valve operating mechanism 36 that causes a valve (not shown) to make opening and closing action to carry out intake and exhausting for a combustion chamber 35. The valve operating mechanism 36 is driven from the crankshaft 23 via a timing chain 36a.

The starting clutch 24 is a centrifugal clutch that makes connection and disconnection between the crankshaft 23 and a primary gear 37 in starting and in stopping and is disposed at the right end part of the crankshaft 23. This starting clutch 24 has a cup-shaped outer case 39 fixed to one end of a sleeve 38 that can rotate relative to the outer circumference of the crankshaft 23, the primary gear 37 provided on the sleeve 38, and an outer plate 40 fixed to the right end part of the crankshaft 23. The starting clutch 24 further has a shoe 42 attached to the outer circumferential part of the outer plate 40 with the intermediary of a weight 41 in such a manner as to face the outside in the radial direction, and a spring 43 for biasing the shoe 42 toward the inside in the radial direction. In the starting clutch 24, when the engine rotation speed is lower than a predetermined value (Ne2), the outer case 39 is separate from the shoe 42 and the automatic transmission system T is in the state of being disconnected from the crankshaft 23 (isolated state in which power is not transmitted thereto). When the engine rotation speed increases to reach the predetermined value (Ne2), the shoe 42 abuts against the inner circumferential surface of the outer case 39 due to the movement of the weight 41 toward the outside in the radial direction against the spring 43 by a centrifugal force. Thereby, the rotation of the crankshaft 23 is transmitted to the primary gear 37 via the outer case 39, so that the automatic transmission system T becomes the connected state in which power is transmitted thereto.

The crankcase 30c includes a crankcase cover 30d covering the starting clutch 24 and the change clutch 51 at its right side surface. When the crankcase cover 30d is removed, the starting clutch 24 and the change clutch 51 are exposed to the outside.

The automatic transmission system T includes the transmission 50 with four shift stages for forward traveling, the change clutch 51 that switches the connection between the side of the crankshaft 23 and the transmission 50, a clutch operation mechanism 52 that operates the change clutch 51, a gear change mechanism 53 that causes gearshift of the transmission 50, and an actuator mechanism 54 (FIG. 3) that drives the clutch operation mechanism 52 and the gear change mechanism 53. The actuator mechanism 54 is controlled by the control unit 17 (FIG. 1).

The automatic transmission system T is connected to a mode switch (not shown) that makes switching between an automatic transmission (AT) mode and a manual transmission (MT) mode and a shift select switch (not shown) operated by the driver for shift-up and shift-down. The automatic transmission system T is configured to be capable of controlling the actuator mechanism 54 according to output signals of the respective sensors, the mode switch, and the shift select switch and switching the shift stage of the transmission 50 automatically or semi-automatically on the basis of control by the control unit 17.

Specifically, in the automatic transmission mode, the actuator mechanism 54 is controlled on the basis of the vehicle speed and so forth and gearshift of the transmission 50 is automatically carried out. In the manual transmission mode, the shift select switch is operated by the driver and thereby gearshift is carried out.

The transmission 50 transmits rotation supplied from the change clutch 51 to the rear wheel 13 with gearshift on the basis of an instruction by the control unit 17. This transmission 50 has a main shaft 56 (major shaft) as an input shaft, a countershaft 57 disposed in parallel to the main shaft 56, drive gears 58a, 58b, 58c, and 58d provided on the main shaft 56, and driven gears 59a, 59b, 59c, and 59d on the countershaft 57. The transmission 50 further has a shift fork 60a that engages with the drive gear 58b, a shift fork 60b that engages with the driven gear 59c, a support shaft 61 that holds the shift forks 60a and 60b slidably in the axial direction, and a shift drum 63 that slides end parts of the shift forks 60a and 60b along grooves 62a and 62b. The drive gears 58a, 58b, 58c, and 58d mesh with the driven gears 59a, 59b, 59c, and 59d, respectively. When the drive gear 58b slides left or right, a dog tooth on its side surface engages with the adjacent drive gear 58a or 58c. When the driven gear 59c slides left or right, a dog tooth on its side surface engages with the adjacent driven gear 59b or 59d.

The drive gears 58a and 58c are held rotatably relative to the main shaft 56 and the driven gears 59b and 59d are held rotatably relative to the countershaft 57. The drive gear 58b and the driven gear 59c are splined to the main shaft 56 and the countershaft 57 and can slide in the axial direction. The drive gear 58d and the driven gear 59a are fixed to the main shaft 56 and the countershaft 57.

When the shift drum 63 is driven by the actuator mechanism 54 and rotates, the shift forks 60a and 60b move in the axial direction along the grooves 62a and 62b of the shift drum 63 and the drive gear 58b and the driven gear 59c slide according to the shift stage.

In the transmission 50, according to the slide of the drive gear 58b and the driven gear 59c, the neutral state or power transmission with selective use of the transmission gear pair of any of first to fourth is enabled between the main shaft 56 and the countershaft 57.

The main shaft 56 and the countershaft 57 are rotatably held by bearings 64a, 64b, 66a, and 66b.

A sprocket 67 is provided at an end part of the countershaft 57 and the sprocket 67 transmits rotation to the rear wheel 13 via the chain 15. Furthermore, near the countershaft 57, a vehicle speed sensor 68 that detects the rotation speed of the countershaft 57 in a contactless manner is provided. The control unit 17 calculates the vehicle speed from a detected value of the vehicle speed sensor 68.

Figure 3:
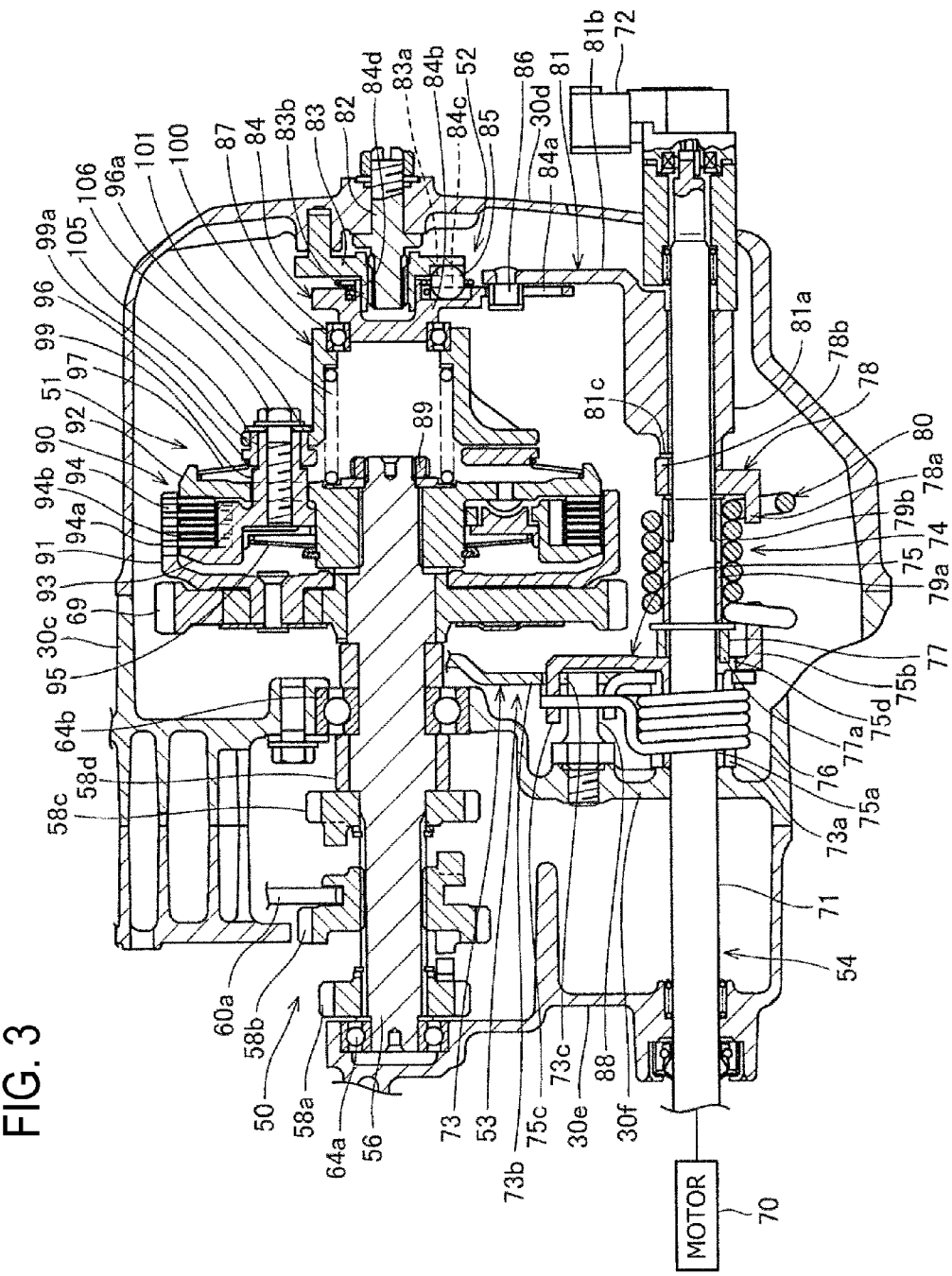
FIG. 3 is a sectional view showing a gear change mechanism, an actuator mechanism, a change clutch, and a clutch operation mechanism.

FIG. 3 is a sectional view showing the gear change mechanism 53, the actuator mechanism 54, the change clutch 51, and the clutch operation mechanism 52.

Referring to FIGS. 2 and 3, the actuator mechanism 54 includes a motor 70 as an actuator, a shift spindle 71 (spindle) extending along the vehicle width direction in the crankcase 30c, and a gear train (not shown) that drives the shift spindle 71 with reduction in the rotation speed of the motor 70.

Both ends of the shift spindle 71 are pivotally supported by a left sidewall 30e of the crankcase 30c and the crankcase cover 30d. In addition, its intermediate part is also pivotally supported by an intermediate wall part 30f that supports the bearing 64b of the main shaft 56. A spindle angle sensor 72 that detects the rotational position of the shift spindle 71 is provided on the crankcase cover 30d.

The gear change mechanism 53 includes a gearshift arm 73 supported by the shift spindle 71 and a power storage mechanism 74 that stores power from the rotation of the shift spindle 71 and releases the stored power to make the gearshift arm 73 pivot.

The gearshift arm 73 is linked to the shift drum 63. The shift drum 63 rotates through the pivot of the gearshift arm 73 by the actuator mechanism 54, so that gearshift is carried out.

The power storage mechanism 74 includes a pivot arm 75 provided on the shaft of the shift spindle 71 rotatably relative to the shift spindle 71, a return spring 76 that biases the gearshift arm 73 to a neutral position, and a stopper collar 77 that is fixed on the axis of the shift spindle 71 and rotates integrally with the shift spindle 71. The power storage mechanism 74 further includes a power storage collar 78 that is fixed on the shaft of the shift spindle 71 at a position separate from the stopper collar 77 in the axial direction and rotates integrally with the shift spindle 71, a pair of spring collars 79a and 79b provided on the shaft between the power storage collar 78 and the stopper collar 77 rotatably relative to the shift spindle 71, and a power storage spring 80 provided to be wound around the outer circumferences of the spring collars 79a and 79b.

The pivot arm 75 has an inside cylindrical part 75a fitted to the outer circumferential surface of the shift spindle 71, and an arm-side locking part 75b protruding in the axial direction from the outer circumferential surface of the inside cylindrical part 75a toward the power storage spring 80. The pivot arm 75 further has a pressing part 75c protruding in the axial direction from the outer circumferential surface of the inside cylindrical part 75a toward the opposite side to the arm-side locking part 75b, and a dog hole 75d opened to the side of the stopper collar 77.

The gearshift arm 73 has an outside cylindrical part 73a fitted to the outer circumferential surface of the inside cylindrical part 75a of the pivot arm 75, and an arm part 73b extended from the outside cylindrical part 73a to the outside in the circumferential direction.

The gearshift arm 73 is provided rotatably relative to the pivot arm 75 and the pressing part 75c of the pivot arm 75 is inserted into a restricting opening 73c formed in the arm part 73b of the gearshift arm 73.

The return spring 76 is a torsion coil spring. It is provided to be wound around the outside cylindrical part 73a of the gearshift arm 73 and biases the gearshift arm 73 in the direction toward the neutral position with the intermediary of the pressing part 75c. The neutral position is the position in the normal state in which gearshift operation is not being carried out. When the pivot arm 75 pivots by a predetermined angle, the pressing part 75c presses the inner edge part of the restricting opening 73c to make the gearshift arm 73 pivot. In the restricting opening 73c, a pin 88 provided upright on the intermediate wall part 30f is inserted. The pin 88 restricts the pivot range of the gearshift arm 73 through the restricting opening 73c.

The stopper collar 77 has a dog tooth 77a inserted into the dog hole 75d of the pivot arm 75. When the stopper collar 77 rotates by a predetermined angle in association with the rotation of the shift spindle 71, the dog tooth 77a biases the pivot arm 75 in the rotation direction through the inner edge of the dog hole 75d.

The power storage collar 78 has a collar-side locking part 78a protruding in the axial direction toward the power storage spring 80 and a clutch-side dog tooth 78b protruding in the axial direction toward the opposite side to the collar-side locking part 78a.

The power storage spring 80 is a torsion coil spring. One end thereof is locked to the arm-side locking part 75b of the pivot arm 75 and the other end is locked to the collar-side locking part 78a of the power storage collar 78.

In the state in which the change clutch 51 is in the connected state and a driving force is generated in the transmission 50, the gearshift arm 73 and the pivot arm 75 are restrained by the transmission 50 and are incapable of pivoting on the shift spindle 71. When the shift spindle 71 is rotated by the actuator mechanism 54 in this state, the power storage collar 78 rotates relative to the pivot arm 75. Thus, with the one end of the power storage spring 80 fixed on the side of the arm-side locking part 75b, the other end on the side of the collar-side locking part 78a is rotated. Thereby, the power storage spring 80 is deformed to start power storing. Thereafter, when the change clutch 51 is disconnected, the gearshift arm 73 and the pivot arm 75 become capable of pivoting and the stored power is released. Thus, the gearshift arm 73 is pressed to pivot by the pressing part 75c of the pivot arm 75 made to pivot by the power stored in the power storage spring 80. Thereby, the shift drum 63 rotates and gearshift is carried out.

The clutch operation mechanism 52 includes a clutch lever 81 rotatably supported on the shift spindle 71, a support shaft 82 fixed to the inner surface of the crankcase cover 30d with a substantially coaxial relationship with the main shaft 56, and a base member 83 that is fixed to the support shaft 82 and has a plate shape. The clutch operation mechanism 52 further includes a lifter cam plate 84 that is joined to the clutch lever 81 and is set opposed to the base member 83 and plural balls 85 clamped between the lifter cam plate 84 and the base member 83.

The clutch lever 81 has a cylindrical part 81a that is adjacent to the power storage collar 78 and is provided on the shift spindle 71 and a lever part 81b extending outward in the radial direction from the cylindrical part 81a. In the cylindrical part 81a, a clutch-side dog hole 81c with which the clutch-side dog tooth 78b of the power storage collar 78 meshes is formed.

The lifter cam plate 84 has a joined part 84a joined to a pin 86 provided at the tip of the lever part 81b of the clutch lever 81 and a pressing operation part 84b facing the base member 83. Cam parts 84c and 83a having a slope shape are formed in the surfaces opposed to each other in the pressing operation part 84b and the base member 83, respectively, and the ball 85 is clamped between the cam parts 84c and 83a. A guide shaft 83b of the base member 83 is fitted into a guide hole 84d made at the center of the lifter cam plate 84. This guides the movement of the lifter cam plate 84 in the axial direction. Furthermore, a ball bearing 87 is provided at the tip part of the pressing operation part 84b and the lifter cam plate 84 is connected to the change clutch 51 with the intermediary of the ball bearing 87.

When the clutch lever 81 is made to pivot, the lifter cam plate 84 is made to pivot about the guide shaft 83b through the pin 86 and moves in the axial direction due to the slide of the cam part 84c relative to the ball 85. The change clutch 51 is connected and disconnected in association with the movement of the lifter cam plate 84 in the axial direction. The lifter cam plate 84 moves in such a direction as to disconnect the clutch whether the shift spindle 71 rotates from the normal position in the shift-up direction or the shift-down direction.

The clutch-side dog hole 81c of the clutch lever 81 has a larger width in the circumferential direction than the clutch-side dog tooth 78b of the power storage collar 78. It is not until the power storage collar 78 rotates by a predetermined angle that the clutch-side dog tooth 78b presses the inner edge of the clutch-side dog hole 81c in the circumferential direction to make the clutch lever 81 pivot. The predetermined angle of the power storage collar 78 is a larger angle than the angle allowing the power storage spring 80 to store sufficient power. That is, in the present first embodiment, after power storing by the power storage spring 80 is completed, the clutch lever 81 is made to pivot and the change clutch 51 is disconnected, so that the stored power is released. Thus, gearshift can be rapidly carried out.

As shown in FIG. 3, at a shaft end of the main shaft 56, a primary driven gear 69 meshing with the primary gear 37 of the crankshaft 23 is pivotally supported rotatably relative to the main shaft 56.

The change clutch 51 includes a cup-shaped clutch outer 91 fixed to the primary driven gear 69, a circular-disc-shaped clutch center 92 that is provided inside the clutch outer 91 in the radial direction and is integrally fixed to the main shaft 56, a pressure plate 93 that can move in the axial direction of the main shaft 56, and a clutch plate 94 provided between the pressure plate 93 and the clutch center 92. The change clutch 51 further includes a main spring 95 that biases the pressure plate 93 in such a direction as to connect the clutch, a lifter plate 96 disposed between the clutch center 92 and the lifter cam plate 84, and a sub-lifter plate 100 disposed between the lifter plate 96 and the lifter cam plate 84.

Furthermore, the change clutch 51 includes a sub-spring 101 clamped between the clutch center 92 and the sub-lifter plate 100 and a second sub-spring 97 clamped between the clutch center 92 and the lifter plate 96.

The clutch center 92 and the pressure plate 93 are combined with each other to become an integrated component and form a clutch inner 90 disposed inside the clutch outer 91.

The clutch outer 91 is integrally fixed to the outside surface of the primary driven gear 69 and can rotate relative to the main shaft 56 integrally with the primary driven gear 69.

The clutch center 92 is splined to the main shaft 56 and is fixed by a nut 89. The clutch center 92 is incapable of rotating relative to the main shaft 56 and moving in the axial direction relative to the main shaft 56.

The pressure plate 93 is disposed inside the cylindrical part of the clutch outer 91. The pressure plate 93 is fitted to the shaft part of the clutch center 92 and is set movably in the axial direction. The pressure plate 93 includes plural circular cylindrical release bosses 99 that penetrate the clutch center 92 and are connected to the lifter plate 96.

The clutch plate 94 is clamped between the clutch center 92 and the pressure plate 93.

The clutch plate 94 includes outside friction plates 94a provided on the clutch outer 91 and inside friction plates 94b provided on the clutch center 92. The outside friction plates 94a and the inside friction plates 94b are alternately disposed in such a manner that the plural friction plates overlap with each other between the pressure plate 93 and the clutch center 92. Each outside friction plate 94a is supported by the cylindrical part of the clutch outer 91 by splining and is set to be movable in the axial direction of the clutch outer 91 and be incapable of rotating relative to the clutch outer 91.

Each inside friction plate 94b is supported by the outer circumferential part of an inside cylindrical part 93b of the pressure plate 93 by splining and is set to be movable in the axial direction of the pressure plate 93 and be incapable of rotating relative to the pressure plate 93.

The main spring 95 biases the pressure plate 93 in such a direction that the clutch plate 94 is clamped by the pressure plate 93 and the clutch center 92, i.e. in such a direction as to connect the clutch.

The release boss 99 of the pressure plate 93 has, at the tip part, a guide shaft part 99a formed with a smaller diameter than the base end part side. To the tip surface of the guide shaft part 99a, a stopper plate 105 having a larger diameter than the guide shaft part 99a is fastened by a bolt 106.

The sub-lifter plate 100 is fitted to the guide shaft part 99a and can move in the axial direction. The tip part of the sub-lifter plate 100 is connected to the lifter cam plate 84 with the intermediary of the ball bearing 87. The sub-lifter plate 100 is prevented from being removed by the stopper plate 105.

The sub-spring 101 is clamped between the clutch center 92 and the sub-lifter plate 100. The biasing force of the sub-spring 101 is transmitted to the pressure plate 93 via the sub-lifter plate 100 and the stopper plate 105 and the pressure plate 93 presses the clutch plate 94 by this biasing force. That is, the sub-spring 101 biases the sub-lifter plate 100 in such a direction as to connect the clutch.

The lifter plate 96 is fitted to the guide shaft part 99a on the side of the clutch center 92 relative to the sub-lifter plate 100 and can move in the axial direction. The lifter plate 96 includes an abutting part 96a that penetrates the sub-lifter plate 100 and abuts against the stopper plate 105, and is prevented from being removed by the stopper plate 105.

The second sub-spring 97 is clamped between the clutch center 92 and the lifter plate 96. The biasing force of the second sub-spring 97 is transmitted to the pressure plate 93 via the lifter plate 96 and the stopper plate 105 and the pressure plate 93 presses the clutch plate 94 by this biasing force. That is, the second sub-spring 97 biases the lifter plate 96 in such a direction as to connect the clutch.

In the clutch-connected state, the clutch plate 94 is clamped by the biasing forces of the main spring 95, the sub-spring 101, and the second sub-spring 97, which enables the rotation of the clutch outer 91 rotated by the primary gear 37 to be transmitted to the clutch center 92 via the clutch plate 94. Thus, the main shaft 56 is rotated integrally with the clutch center 92.

When the pressure plate 93 is moved toward the primary driven gear 69 through the lifter cam plate 84 against the biasing forces of the main spring 95, the sub-spring 101, and the second sub-spring 97, the clamping of the clutch plate 94 is released, resulting in the clutch-disconnected state.

In the case of carrying out shift-up, the control unit 17 rotates the motor 70 to rotate the shift spindle 71 in the shift-up direction. In association with the rotation of the shift spindle 71, power storing by the power storage mechanism 74 is started. When the shift spindle 71 rotates by a predetermined amount, the clutch lever 81 is made to pivot through the clutch-side dog tooth 78b of the power storage collar 78. This disconnects the change clutch 51. In association with this, the stored power is released and the gearshift arm 73 is made to pivot, which rotates the shift drum 63. Thus, the gear position is shifted up by one stage.

In the case of carrying out shift-down, the control unit 17 rotates the motor 70 to rotate the shift spindle 71 in the shift-down direction opposite to the shift-up direction. At the time of the shift-down, the power storing by the power storage mechanism 74 is not carried out. In the shift-down, in association with the rotation of the shift spindle 71, the clutch lever 81 pivots and the change clutch 51 is disconnected. In addition, the dog tooth 77a of the stopper collar 77 makes the pivot arm 75 pivot and the gearshift arm 73 is made to pivot in the shift-down direction through the pivot arm 75. This rotates the shift drum 63, so that the gear position is shifted down by one stage.

In the shift-up and the shift-down, when the completion of the gearshift is detected on the basis of a detection result of the spindle angle sensor 72 or a gear position sensor 63a, the shift spindle 71 is reversely rotated, so that the gearshift arm 73 returns to the original position and the change clutch 51 is connected.

In the present first embodiment, the gear change mechanism 53 and the clutch operation mechanism 52 are driven by the single shift spindle 71 rotated by the one motor 70. Therefore, one is enough as the number of motors 70, which can make the structure simple.

Figure 4:
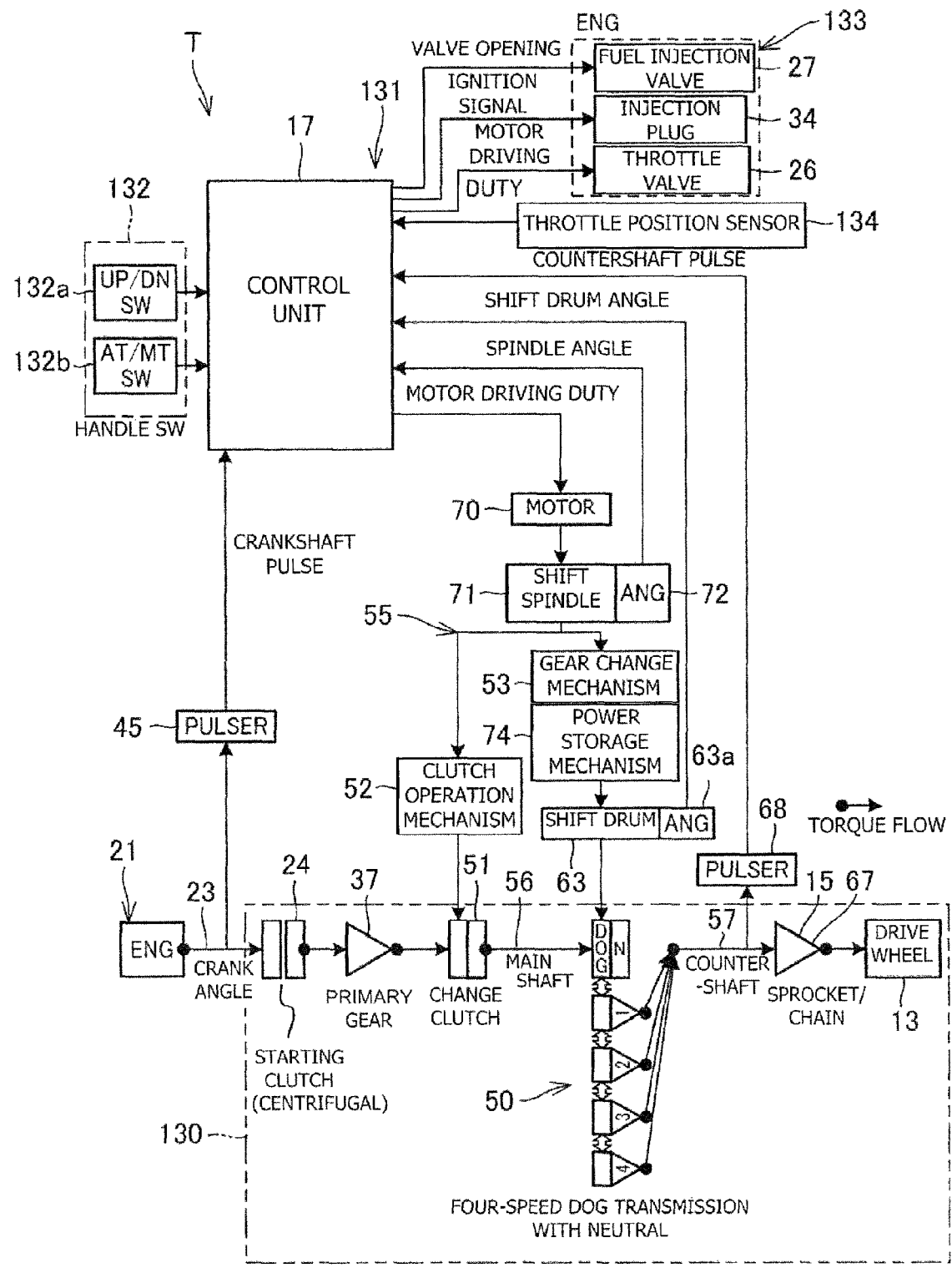
FIG. 4 is a block diagram showing the configuration of an automatic transmission system.

FIG. 4 is a block diagram showing the configuration of the automatic transmission system T.

As shown in FIG. 4, the automatic transmission system T includes a drive train unit 130 including the starting clutch 24, the primary gear 37, the change clutch 51, the main shaft 56, the transmission 50, the countershaft 57, the chain 15, the sprocket 67, and the rear wheel 13. The automatic transmission system T further includes an actuator mechanical unit 55 that mechanically operates the transmission 50 and the change clutch 51, an electrical component unit 131, and an engine operation control unit 133 that directly controls operation of the engine 21.

The drive train unit 130 mechanically transmits power of the crankshaft 23 to the rear wheel 13.

The actuator mechanical unit 55 includes the motor 70, the shift spindle 71, the gear change mechanism 53, the power storage mechanism 74, the shift drum 63, and the clutch operation mechanism 52.

The engine operation control unit 133 includes the throttle valve 26, the fuel injection valve 27, and the ignition plug 34.

The throttle valve 26 is an electronically-controlled one and is driven by a throttle valve drive motor (not shown) controlled by the control unit 17. Specifically, the control unit 17 detects, by a sensor, the amount of operation of a throttle grip (not shown) that is provided at the handlebar 11 and is operated by the driver and drives the throttle valve drive motor according to this amount of operation to regulate the degree of opening of the throttle valve 26.

The ignition plug 34 is connected to the control unit 17 via an ignition coil driver and an ignition coil (neither is shown).

The electrical component unit 131 includes the control unit 17, an engine rotation speed sensor 45 (rotation speed sensor), the spindle angle sensor 72, the gear position sensor 63a, a throttle position sensor 134, the vehicle speed sensor 68, and a handle switch 132 provided at the handlebar 11.

The control unit 17 has a CPU and a storage part composed of a ROM, a RAM, and so forth and controls the actuator mechanical unit 55 and the engine operation control unit 133 on the basis of control information such as a control map in the storage part.

The engine rotation speed sensor 45 outputs the rotation speed of the crankshaft 23 to the control unit 17.

The control unit 17 can determine the state of the transmission 50, i.e. whether or not the transmission 50 is carrying out gearshift, from a detected value of the spindle angle sensor 72.

The gear position sensor 63a outputs the rotational angle of the shift drum 63 to the control unit 17 and the control unit 17 determines the present gear position (shift stage) from this rotational angle.

The throttle position sensor 134 outputs the degree of opening of the throttle valve 26 to the control unit 17.

The handle switch 132 includes a shift select switch 132a and a mode switch 132b.

The control unit 17 controls the motor 70 to automatically carry out gearshift operation and clutch operation on the basis of signals from the engine rotation speed sensor 45, the spindle angle sensor 72, the gear position sensor 63a, the throttle position sensor 134, and the vehicle speed sensor 68.

Furthermore, the control unit 17 adjusts the degree of opening of the throttle valve 26, the amount of injection of the fuel injection valve 27, and the ignition timing of the ignition plug 34 according to the amount of operation of the throttle grip. The control unit 17 corrects the degree of opening of the throttle valve 26, the amount of injection of the fuel injection valve 27, and the ignition timing of the ignition plug 34 on the basis of detected values of the throttle position sensor 134, the engine rotation speed sensor 45, the spindle angle sensor 72, the gear position sensor 63a, and the vehicle speed sensor 68.

When determining that the motorcycle 10 has stopped from signals of the vehicle speed sensor 68 and so forth, the control unit 17 of the present first embodiment drives the motor 70 to change the gear position to the neutral state (first state, depending on the vehicle model). Thus, in the state in which the driver has turned off the main power supply of the motorcycle 10 and parked it after the stop, the gear position is in the neutral state (first state, depending on the vehicle model). In this case, when the driver starts the engine 21 next time, the engine 21 is started in the state in which the gear position is neutral.

However, there is a possibility that the motorcycle 10 is parked in the state in which the gear position is second or higher. For example, if the driver stops the motorcycle 10 by turning off the main power supply of the motorcycle 10 in driving with the fourth gear position, the motorcycle 10 is parked in the state in which the gear position is fourth because power is not supplied to the control unit 17 and the motor 70 is also not driven. In this case, when the driver starts the engine 21 next time, the engine 21 is started in the state in which the gear position is fourth. If the engine 21 is started in the state in which the gear position is fourth, the control unit 17 carries out control to make shift-down of the gear position to neutral (first state, depending on the vehicle model) immediately after the starting of the engine 21 so that the motorcycle 10 can smoothly start.

Figure 5:
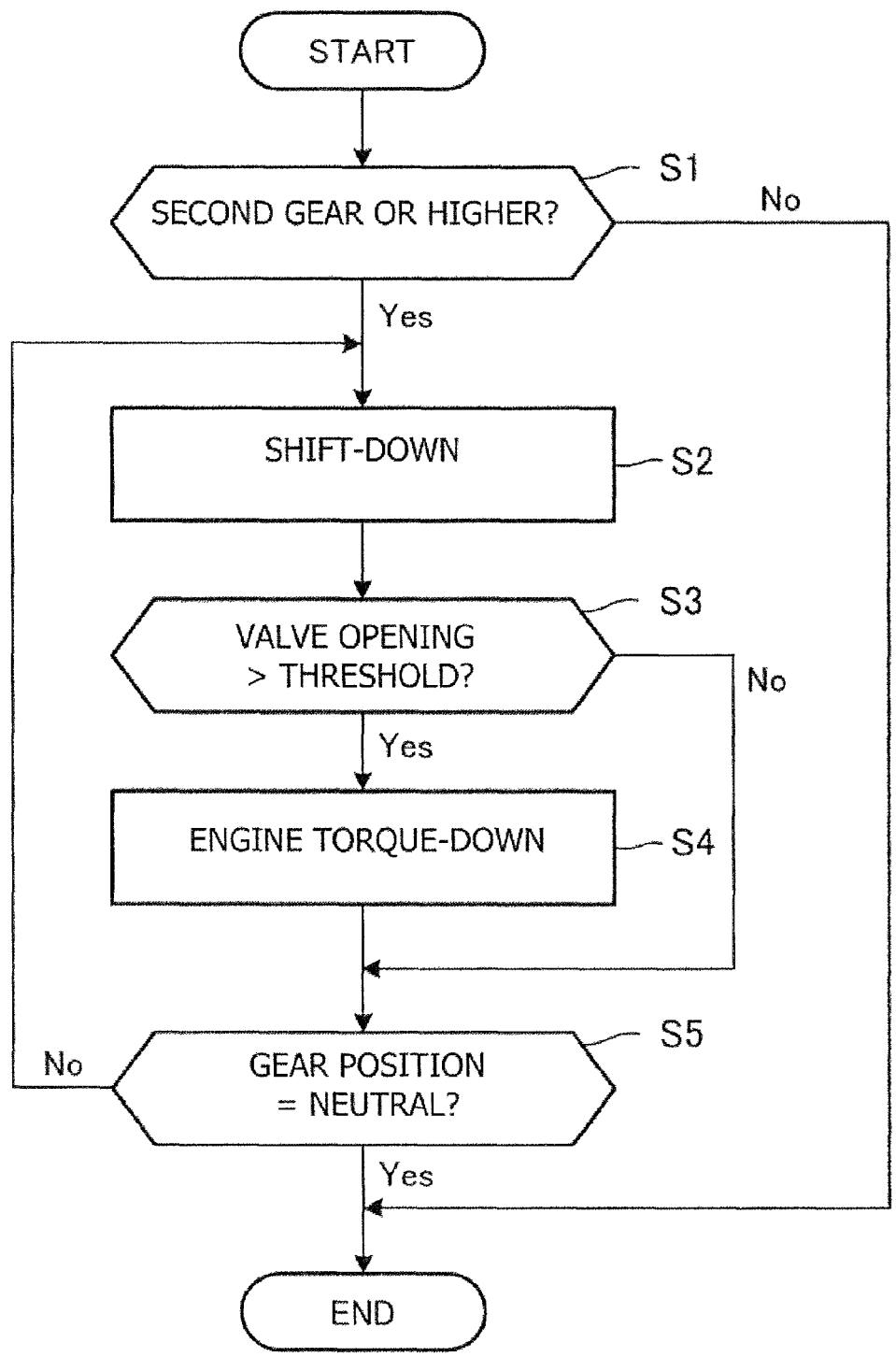
FIG. 5 is a flowchart showing processing of a control unit when an engine is started.
Figure 6:
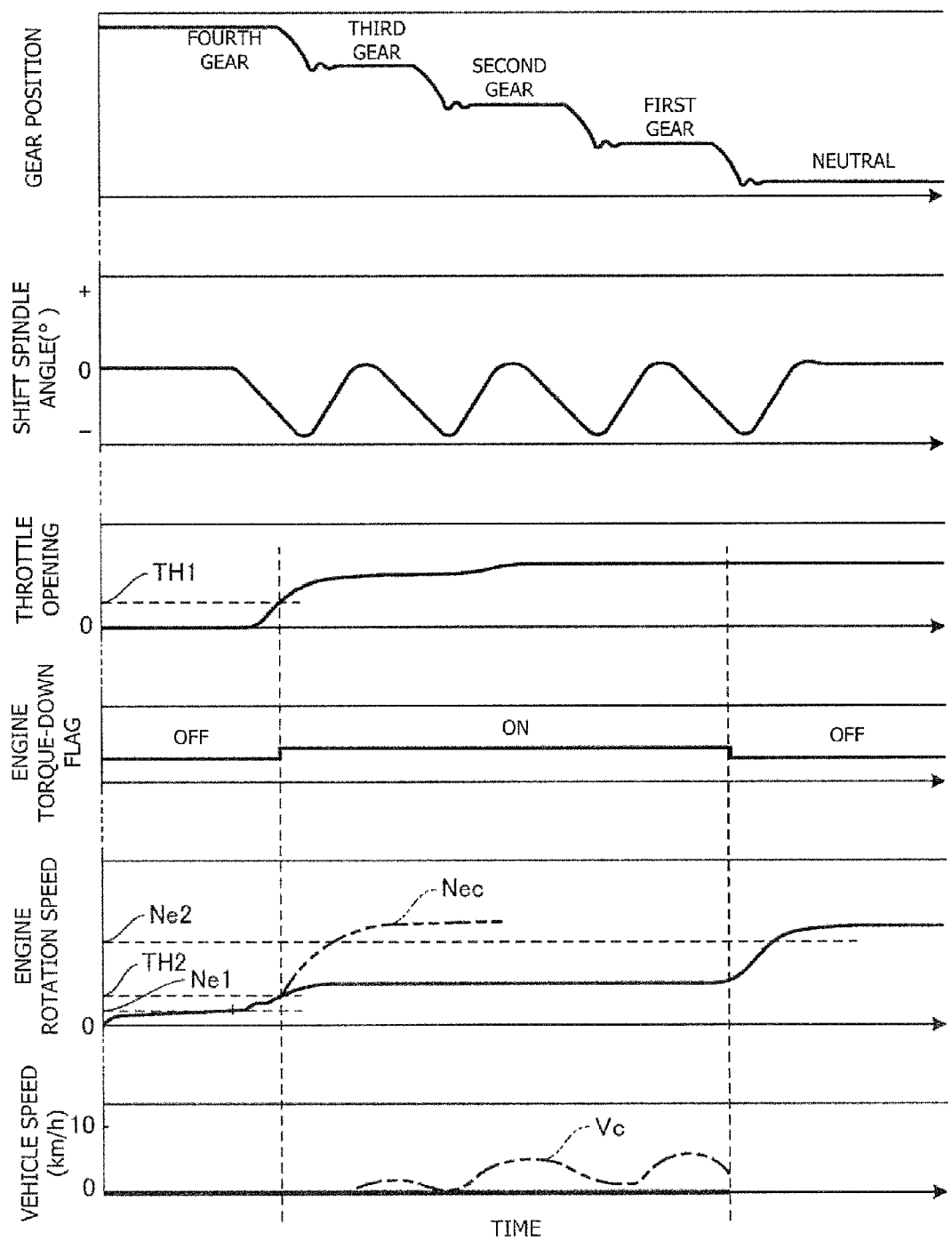
FIG. 6 is a diagram showing a gear position, the angle of a shift spindle, a flag of control, a degree of opening of a throttle valve, a rotation speed of the engine, and a vehicle speed when the engine is started.

FIG. 5 is a flowchart showing processing of the control unit 17 when the engine 21 is started. FIG. 6 is a diagram showing the gear position, the angle of the shift spindle 71, a flag of control, the degree of opening of the throttle valve 26, the rotation speed of the engine 21, and the vehicle speed when the engine is started. In FIG. 6, the time is indicated on the abscissa. The control unit 17 repeatedly executes the processing of FIG. 5 at a predetermined cycle.

The engine 21 has a starter motor (not shown) that drives the crankshaft 23. When a driver operates an engine start button (not shown), the control unit 17 drives the starter motor to start the engine 21. When detecting that the rotation speed of the engine 21 has reached a rotation speed Ne1 of complete explosion determination by the engine rotation speed sensor 45, the control unit 17 determines that the engine 21 is normally started. The rotation speed Ne1 is a rotation speed lower than or equivalent to the idling rotation speed of the engine 21.

When the engine start button is operated, the control unit 17 starts the engine 21 and determines whether or not the gear position is second or higher on the basis of a detected value of the gear position sensor 63a (step S1). If the gear position is neutral or first (step S1: No), the control unit 17 ends the processing.

If the gear position is second or higher (step S1: Yes), i.e. if the gear position is fourth as shown in FIG. 6, the control unit 17 drives the motor 70 to rotate the shift spindle 71 in the shift-down direction (step S2) and make shift-down of the gear position (e.g. shift-down from fourth to third).

Subsequently, the control unit 17 acquires the degree of opening of the throttle valve 26 on the basis of a detected value of the throttle position sensor 134 and determines whether or not the degree of opening of the throttle valve 26 reaches a throttle opening threshold TH1 (step S3). The throttle opening threshold TH1 is set to a degree of opening with which the rotation speed of the engine 21 is higher than the idling rotation speed of the engine 21 and is lower than the rotation speed Ne2, at which the connection of the starting clutch 24 due to a centrifugal force is started. The throttle opening threshold TH1 may be set to a degree of opening with which the rotation speed of the engine 21 is equivalent to the rotation speed Ne2, at which the connection of the starting clutch 24 is started.

If the degree of opening of the throttle valve 26 reaches the throttle opening threshold TH1 (step S3: Yes), the control unit 17 turns on a flag of engine torque-down (step S4). When the flag of engine torque-down is turned on, the control unit 17 limits the amount of fuel injection of the fuel injection valve 27 to an amount with which the rotation speed of the engine 21 is lower than the rotation speed Ne2 of the connection of the starting clutch 24. That is, in the step S4, control to lower the rotation speed of the engine 21 is carried out, so that the torque of the engine 21 is forcibly lowered.

If the driver operates the throttle grip to a large extent immediately after the starting of the engine 21, the degree of opening of the throttle valve 26 becomes high. However, in the present first embodiment, the amount of fuel injection of the fuel injection valve 27 is limited and therefore the starting clutch 24 is prevented from being connected in the middle of shift-down from a high gear position. Thus, during the control of the engine torque-down, the vehicle speed of the motorcycle 10 is 0 km/h as shown by a heavy line in the time chart of the vehicle speed in FIG. 6 (at the same height as the abscissa of the chart).

Next, the control unit 17 determines whether or not the gear position is neutral on the basis of a detected value of the gear position sensor 63a (step S5). If determining that the gear position is not neutral (step S5: No), the control unit 17 returns to the processing of the step S2 and carries out shift-down by one more stage. The processing of the step S2 to the step S5 is repeatedly executed until it is determined in the step S5 that the gear position is neutral.

If determining that the gear position is neutral (step S5: Yes), the control unit 17 turns off the flag of engine torque-down and ends the processing. This releases the limit of the amount of fuel injection of the fuel injection valve 27, so that the fuel is supplied with the amount of fuel injection according to the actual degree of opening of the throttle valve 26. Thereafter, according to the amount of operation of the throttle grip, the control unit 17 carries out shift-up of the gear position from neutral to first (not shown) and increases the rotation speed of the engine 21 to the rotation speed Ne2 or higher to connect the starting clutch 24 and start the motorcycle 10.

If the degree of opening of the throttle valve 26 does not reach the throttle opening threshold TH1 (step S3: No), the control unit 17 determines whether or not the gear position is neutral on the basis of a detected value of the gear position sensor 63a (step S5).

If determining that the gear position is not neutral (step S5: No), the control unit 17 returns to the processing of the step S2 and carries out shift-down by one more stage. The processing of the step S2, the step S3, and the step S5 is repeatedly executed until the gear position becomes neutral if the degree of opening of the throttle valve 26 does not reach the throttle opening threshold TH1 in the step S3. If determining that the gear position is neutral (step S5: Yes), the control unit 17 ends the processing.

Although it is determined in the step S5 whether or not the gear position is neutral in the present first embodiment, it may be determined whether or not the gear position is first, instead of being neutral, depending on the vehicle model.

In the present first embodiment, engine torque-down is not carried out in the normal case in which the degree of opening of the throttle valve 26 does not reach the throttle opening threshold TH1. Therefore, in the normal case, the engine 21 immediately after being started can be rotated at a proper rotation speed and the starting performance and warm-up performance of the engine 21 can be ensured.

The processing of the flowchart of FIG. 5 is executed immediately after the starting of the engine 21. After one round of the processing ends, the processing is not executed until the next starting of the engine 21.

As a comparative example, the case in which engine torque-down is not carried out will be described.

In the case in which engine torque-down is not carried out immediately after starting in the state in which the gear position is fourth, when the degree of opening of the throttle valve 26 becomes high, a rotation speed Nec of the engine in the comparative example reaches the rotation speed Ne2 as shown by a two-dot chain line in FIG. 6. Thus, the starting clutch 24 is connected in the middle of shift-down from the high gear position. In this case, because the gear position is high and sufficient starting torque is not obtained, the motorcycle 10 advances only instantaneously when the starting clutch 24 is connected and a vehicle speed Vc is generated. Furthermore, when the change clutch 51 is disconnected and connected in association with the shift-down in the state in which the starting clutch 24 is connected, the load of the engine 21 changes and a swing of the driving force occurs. This operation is repeated every shift-down, which causes a swing of the driving force. This driving force is larger when the gear position is a lower speed position.

As described above, according to the first embodiment of the present invention, the motorcycle 10 includes the power unit 16 having the engine 21, the starting clutch 24 that transmits the engine driving force to the downstream side when the rotation speed of the engine 21 becomes the rotation speed Ne2 as a predetermined value or higher, the change clutch 51 on the downstream side of the starting clutch 24, the stepped transmission 50 having the main shaft 56 to which the rotation of the change clutch 51 is transmitted and the countershaft 57, and the single shift spindle 71 that operates the change clutch 51 and the transmission 50. The motorcycle 10 further includes the gear position sensor 63a that detects the shift stage of the transmission 50, the motor 70 that drives the shift spindle 71, and the control unit 17 that operates the motor 70. When the engine 21 is started in the state in which the transmission 50 is in second gear or higher, the motor 70 is driven to carry out shift-down operation and the rotation speed as the output of the engine 21 is limited to a rotation speed lower than the rotation speed Ne2 until the gear position of the transmission 50 is set neutral. Due to this, when the engine 21 is started in the state in which the transmission 50 is in second gear or higher, the motor 70 is driven and the shift-down operation is carried out. In addition, the output of the engine 21 is limited to a rotation speed lower than the rotation speed Ne2, at which transmission of the driving force by the starting clutch 24 is started. Therefore, the transmission of the driving force by the starting clutch 24 is not carried out until the gear position is shifted down to neutral. This can prevent application of the driving force to the starting clutch 24 in the state with a high gear position and prevent the occurrence of sluggish starting and the swing of the driving force in association with the disconnection and connection of the change clutch 51.

Furthermore, the motorcycle 10 includes the throttle position sensor 134 that detects the degree of opening of the throttle valve 26 of the intake pipe 25 of the engine 21, and engine torque-down control is carried out if the degree of opening of the throttle valve 26 reaches the throttle opening threshold TH1. Due to this, the output of the engine 21 is reduced only when the degree of opening of the throttle valve 26 reaches the throttle opening threshold TH1 and the motorcycle 10 becomes the state in which the engine torque-down control is necessary. Therefore, the output of the engine 21 is not reduced in the other states. Thus, the gear position can be shifted down to neutral with ensuring of favorable starting performance and warm-up performance of the engine 21.

Second Embodiment

A second embodiment of the present invention will be described below with reference to FIG. 7. In this second embodiment, a part configured similarly to the above first embodiment is given the same symbol and description thereof is omitted.

In the above first embodiment, it is explained that the control unit 17 carries out engine torque-down on the basis of whether or not the degree of opening of the throttle valve 26 reaches the throttle opening threshold TH1. The present second embodiment is different from the above first embodiment in that the engine torque-down is carried out on the basis of the rotation speed of the engine 21.

Figure 7:
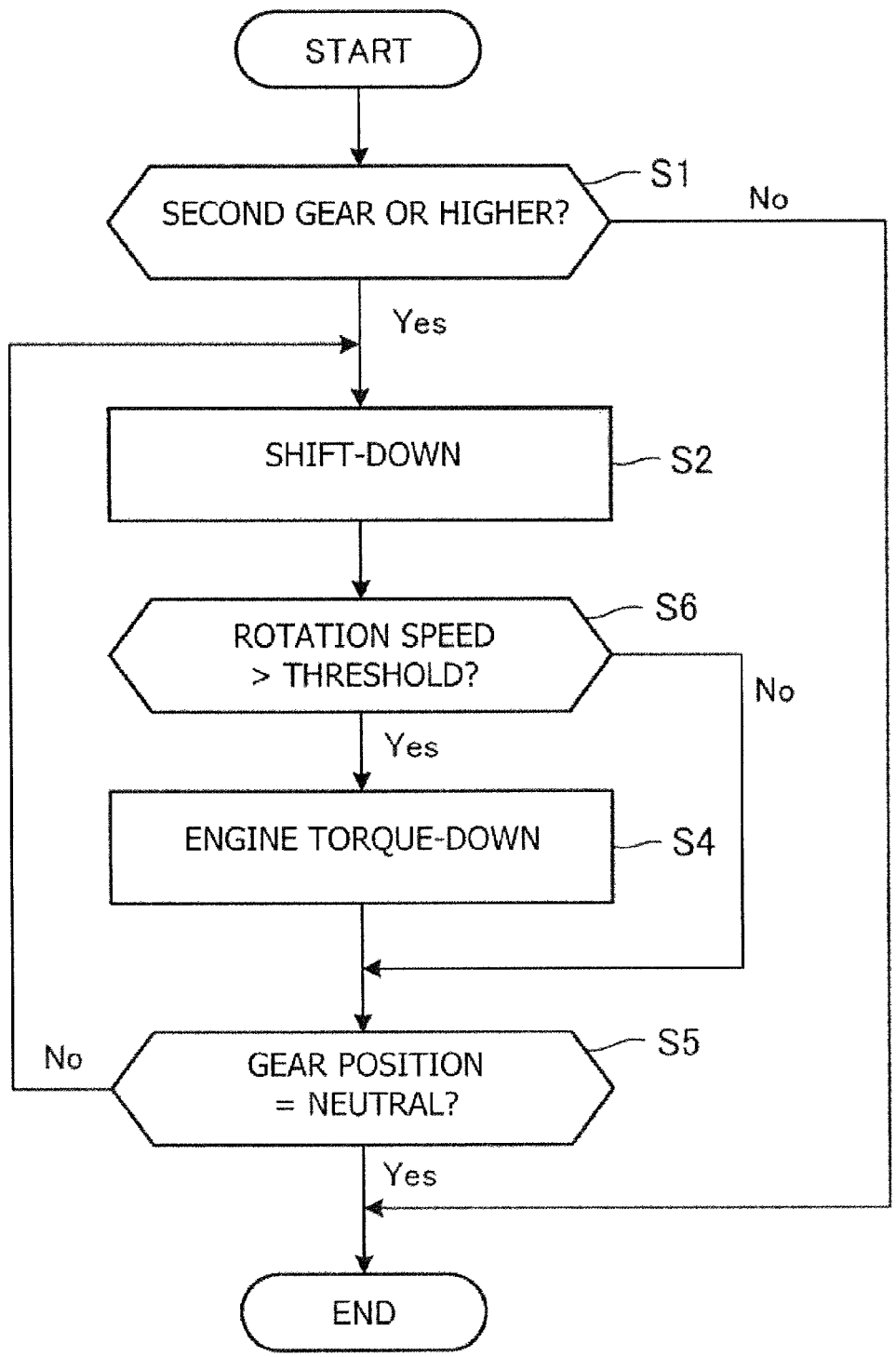
FIG. 7 is a flowchart showing processing of the control unit when the engine is started in a second embodiment.

FIG. 7 is a flowchart showing processing of the control unit 17 when the engine 21 is started in the second embodiment. In the processing included in the operation shown in FIG. 7, steps in which the same processing as that in FIG. 5 in the above-described first embodiment is executed are given the same numbers.

First, when the engine start button is operated, the control unit 17 starts the engine 21 and determines whether or not the gear position is second or higher on the basis of a detected value of the gear position sensor 63a (step S1). If the gear position is neutral or first (step S1: No), the control unit 17 ends the processing.

If the gear position is second or higher (step S1: Yes), i.e. if the gear position is fourth as shown in FIG. 6, the control unit 17 drives the motor 70 to rotate the shift spindle 71 in the shift-down direction (step S2) and make shift-down of the gear position.

Subsequently, the control unit 17 acquires the rotation speed of the engine 21 on the basis of a detected value of the engine rotation speed sensor 45 and determines whether or not the rotation speed reaches a rotation speed threshold TH2 (FIG. 6) (step S6). The rotation speed threshold TH2 is set to a rotation speed that is higher than the idling rotation speed of the engine 21 and is lower than the rotation speed Ne2, at which the connection of the starting clutch 24 due to a centrifugal force is started. The rotation speed threshold TH2 may be set to a rotation speed equivalent to the rotation speed Ne2.

If the rotation speed of the engine 21 reaches the rotation speed threshold TH2 (step S6: Yes), the control unit 17 turns on the flag of engine torque-down (step S4). When the flag of engine torque-down is turned on, the control unit 17 limits the amount of fuel injection of the fuel injection valve 27 to an amount with which the rotation speed of the engine 21 does not reach the rotation speed Ne2. That is, in the step S4, control to lower the rotation speed of the engine 21 is carried out, so that the torque of the engine 21 is forcibly lowered.

Next, the control unit 17 determines whether or not the gear position is neutral on the basis of a detected value of the gear position sensor 63a (step S5). If determining that the gear position is not neutral (step S5: No), the control unit 17 returns to the processing of the step S2 and carries out shift-down by one more stage. The processing of the step S2, the step S6, the step S4, and the step S5 is repeatedly executed until it is determined in the step S5 that the gear position is neutral.

If determining that the gear position is neutral (step S5: Yes), the control unit 17 turns off the flag of engine torque-down and ends the processing. This releases the limit of the amount of fuel injection of the fuel injection valve 27, so that the fuel is supplied with the amount of fuel injection according to the actual degree of opening of the throttle valve 26. Thereafter, according to the amount of operation of the throttle grip, the control unit 17 carries out shift-up of the gear position from neutral to first (not shown) and increases the rotation speed of the engine 21 to the rotation speed Ne2 or higher to connect the starting clutch 24 and start the motorcycle 10.

If the rotation speed of the engine 21 does not reach the rotation speed threshold TH2 (step S6: No), the control unit 17 determines whether or not the gear position is neutral on the basis of a detected value of the gear position sensor 63a (step S5).

If determining that the gear position is not neutral (step S5: No), the control unit 17 returns to the processing of the step S2 and carries out shift-down by one more stage. The processing of the step S2, the step S6, and the step S5 is repeatedly executed until the gear position becomes neutral if the rotation speed of the engine 21 does not reach the rotation speed threshold TH2. If determining that the gear position is neutral (step S5: Yes), the control unit 17 ends the processing.

In the present second embodiment, engine torque-down is not carried out in the normal case in which the rotation speed of the engine 21 does not reach the rotation speed threshold TH2. Therefore, in the normal case, the engine 21 immediately after being started can be rotated at a proper rotation speed and the starting performance and warm-up performance of the engine 21 can be ensured.

The processing of the flowchart of FIG. 7 is executed immediately after the starting of the engine 21. After one round of the processing ends, the processing is not executed until the next starting of the engine 21.

According to the second embodiment, the motorcycle 10 includes the engine rotation speed sensor 45 that detects the rotation speed of the engine 21, and engine torque-down control is carried out if the rotation speed of the engine 21 reaches the rotation speed threshold TH2. Due to this, the output of the engine 21 is reduced only when the rotation speed of the engine 21 reaches the rotation speed threshold TH2 and the motorcycle 10 becomes the state in which the engine torque-down control is necessary. Therefore, the output of the engine 21 is not reduced in the other states. This can carry out shift-down of the gear position to neutral while ensuring favorable starting performance and warm-up performance of the engine 21.

Third Embodiment

A third embodiment of the present invention will be described below with reference to FIG. 8. In this third embodiment, a part configured similarly to the above first embodiment is given the same symbol and description thereof is omitted.

The present third embodiment is different from the above first embodiment in the following point and so forth. Specifically, after engine torque-down, it is determined whether or not shift-down is currently being carried out. Then, shift-down is continued if shift-down is currently being carried out, and shift-down is prohibited if shift-down is not currently being carried out.

Figure 8:
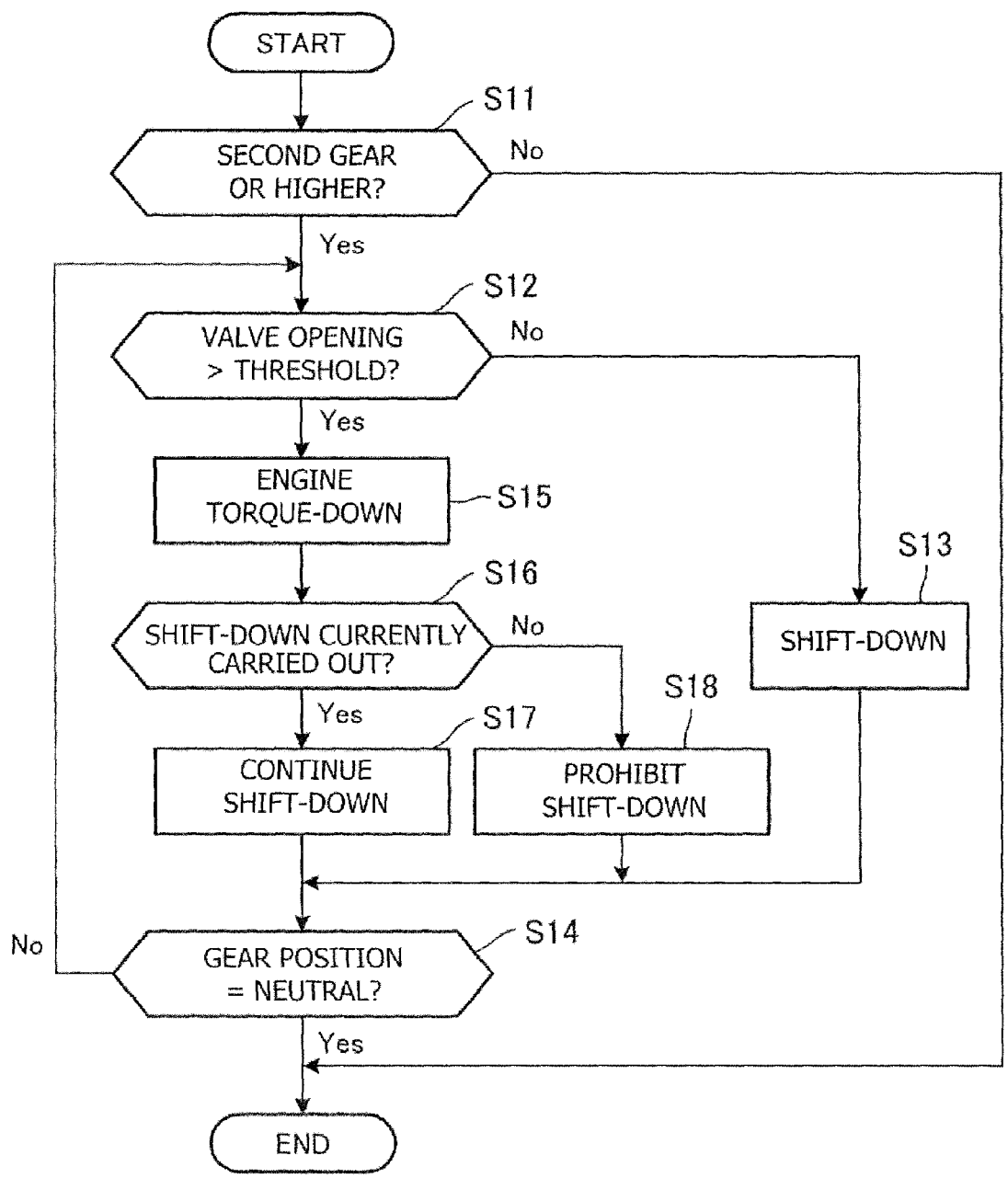
FIG. 8 is a flowchart showing processing of the control unit when the engine is started in a third embodiment.

FIG. 8 is a flowchart showing processing of the control unit 17 when the engine 21 is started in the third embodiment. The control unit 17 repeatedly executes the processing of FIG. 8 at a predetermined cycle.

First, when the engine start button is operated, the control unit 17 starts the engine 21 and determines whether or not the gear position is second or higher on the basis of a detected value of the gear position sensor 63a (step S11). If the gear position is neutral or first (step S11: No), the control unit 17 ends the processing.

If the gear position is second or higher (step S11: Yes), i.e. if the gear position is fourth as shown in FIG. 6, the control unit 17 acquires the degree of opening of the throttle valve 26 on the basis of a detected value of the throttle position sensor 134 and determines whether or not the degree of opening of the throttle valve 26 reaches the throttle opening threshold TH1 (step S12). The throttle opening threshold TH1 is set to a degree of opening with which the rotation speed of the engine 21 is higher than the idling rotation speed of the engine 21 and is lower than the rotation speed Ne2, at which the connection of the starting clutch 24 due to a centrifugal force is started.

As above, shift-down is carried out if the degree of opening of the throttle valve 26 is lower than the throttle opening threshold. TH1. This can prevent the connection of the starting clutch 24 in the middle of shift-down. The throttle opening threshold TH1 may be set to a degree of opening with which the rotation speed of the engine 21 is equivalent to the rotation speed Ne2, at which the connection of the starting clutch 24 is started.

If the degree of opening of the throttle valve 26 does not reach the throttle opening threshold TH1 (step S12: No), the control unit 17 starts operation of driving the motor 70 to rotate the shift spindle 71 in the shift-down direction (step S13) and make shift-down of the gear position (e.g. shift-down from fourth to third).

Next, the control unit 17 determines whether or not the gear position is neutral on the basis of a detected value of the gear position sensor 63a (step S14).

If determining that the gear position is neutral (step S14: Yes), the control unit 17 ends the processing.

If determining that the gear position is not neutral (step S14: No), the control unit 17 returns to the processing of the step S12 and determines whether or not the degree of opening of the throttle valve 26 reaches the throttle opening threshold TH1. If the degree of opening of the throttle valve 26 reaches the throttle opening threshold TH1 for any reason, the control unit 17 turns on the flag of engine torque-down (step S15). When the flag of engine torque-down is turned on, the control unit 17 limits the amount of fuel injection of the fuel injection valve 27 to an amount with which the rotation speed of the engine 21 does not reach the rotation speed Net of the connection of the starting clutch 24. That is, in the step S15, control to lower the rotation speed of the engine 21 is carried out, so that the torque of the engine 21 is forcibly lowered.

Subsequently, the control unit 17 determines whether or not the shift spindle 71 is currently rotating in the shift-down direction, i.e. whether or not the transmission 50 is currently carrying out gearshift, on the basis of a detected value of the spindle angle sensor 72 (step S16).

If determining that the transmission 50 is currently carrying out gearshift (step S16: Yes), the control unit 17 continues the operation of the shift-down (step S17) and makes transition to the step S14. Thereby, the operation of the shift-down by one stage currently being carried out is executed until the completion of the shift-down.

If determining that the transmission 50 is not currently carrying out gearshift (step S16: No), the control unit 17 prohibits operation of shift-down (step S18) and determines whether or not the gear position is neutral (step S14). The control unit 17 ends the processing if the gear position is neutral (step S14: Yes). If the gear position is not neutral (step S14: No), the control unit 17 returns to the step S12 and determines whether or not the degree of opening of the throttle valve 26 reaches the throttle opening threshold TH1. If the degree of opening of the throttle valve 26 does not reach the throttle opening threshold TH1 (step S12: No), i.e. if the degree of opening of the throttle valve 26 increased once falls below the throttle opening threshold TH1, the prohibition of operation of shift-down is released and shift-down is carried out. If the degree of opening of the throttle valve 26 reaches the throttle opening threshold TH1 (step S12: Yes), the prohibition of operation of shift-down is continued. That is, the prohibition of operation of shift-down is continued only for a short period until the degree of opening of the throttle valve 26 falls below the throttle opening threshold TH1.

Thus, in the case in which the rotation speed of the engine 21 becomes high for any reason, it is possible to prevent a situation in which shift-down is repeatedly carried out and a swing of the driving force in association with disconnection and connection of the change clutch 51 occurs. Furthermore, in the case in which gearshift is currently being carried out, this one time of shift-down is permitted and therefore a swing of the driving force occurs only one time.

Thereafter, if determining that the gear position is neutral (step S14: Yes), the control unit 17 turns off the flag of engine torque-down and ends the processing. This releases the limit of the amount of fuel injection of the fuel injection valve 27, so that the fuel is supplied with the amount of fuel injection according to the actual degree of opening of the throttle valve 26. Thereafter, according to the amount of operation of the throttle grip, the control unit 17 carries out shift-up of the gear position from neutral to first (not shown) and increases the rotation speed of the engine 21 to the rotation speed Ne2 or higher to connect the starting clutch 24 and start the motorcycle 10.

The processing of the flowchart of FIG. 8 is executed immediately after the starting of the engine 21. After one round of the processing ends, the processing is not executed until the next starting of the engine 21.

As described above, according to the third embodiment of the present invention, the motorcycle 10 includes the power unit 16 having the engine 21, the starting clutch 24 that transmits the engine driving force to the downstream side when the rotation speed of the engine 21 becomes the rotation speed Ne2 as a predetermined value or higher, the change clutch 51 on the downstream side of the starting clutch 24, the stepped transmission 50 having the main shaft 56 to which the rotation of the change clutch 51 is transmitted and the countershaft 57, and the single shift spindle 71 that operates the change clutch 51 and the transmission 50. The motorcycle 10 further includes the gear position sensor 63a that detects the shift stage of the transmission 50, the motor 70 that drives the shift spindle 71, the control unit 17 that operates the motor 70, and the throttle position sensor 134 that detects the degree of opening of the throttle valve 26 of the intake pipe 25 of the engine 21. When the engine 21 is started in the state in which the transmission 50 is in second gear or higher, the motor 70 is driven to carry out shift-down operation if the degree of opening of the throttle valve 26 does not reach the throttle opening threshold TH1, and engine torque-down control to limit the rotation speed as the output of the engine 21 to a rotation speed lower than the rotation speed Ne2 is carried out if the degree of opening of the throttle valve 26 reaches the throttle opening threshold TH1. In the period of engine torque-down by the engine torque-down control, shift-down is continued if the shift spindle 71 is currently rotating due to shift-down operation, and shift-down is prohibited if shift-down operation is not currently being carried out. Due to this, if the degree of opening of the throttle valve 26 reaches the throttle opening threshold TH1 for any reason, the engine torque-down control is carried out and shift-down is prohibited if shift-down operation is not currently being carried out. This can prevent the disconnection and connection of the change clutch 51 in association with the shift-down operation in the state in which the output of the engine 21 is high. Furthermore, in the case in which the engine torque-down control is carried out, if shift-down operation is currently being carried out, only this shift-down operation is continued. Thus, the number of times of the disconnection and connection of the change clutch 51 is suppressed to only one. Thus, the occurrence of sluggish starting and the swing of the driving force in association with the disconnection and connection of the change clutch 51 can be prevented.

The above embodiments show one aspect of the present disclosure and the present invention is not limited to the above embodiments.

In the above first to third embodiments, it is explained that the processing of the flowcharts is ended when the gear position of the transmission 50 is shifted down to neutral. However, the present invention is not limited thereto. For example, the control unit 17 may end the processing of the above flowcharts when the gear position is set to first.

Furthermore, in the above first to third embodiments, it is explained that, when the flag of engine torque-down is turned on, the control unit 17 limits the amount of fuel injection of the fuel injection valve 27 to an amount with which the rotation speed of the engine 21 does not reach the rotation speed Ne2 of the connection of the starting clutch 24. However, the present invention is not limited thereto. The engine torque-down can be carried out by each of reduction in the amount of fuel injection, retarding of the ignition timing of the ignition plug 34, and change in the degree of opening of the throttle valve 26. A configuration to carry out the engine torque-down by combining them may be employed.

Moreover, in the above third embodiment, it is explained that the control unit 17 carries out engine torque-down on the basis of whether or not the degree of opening of the throttle valve 26 reaches the throttle opening threshold TH1. However, the present invention is not limited thereto. For example, a configuration to carry out engine torque-down based on the rotation speed threshold TH2 of the rotation speed of the engine 21 as with the above second embodiment may be employed.

The embodiment of the present invention is characterized in the following configuration in a transmission system of a vehicle including a power unit (16) having an engine (21), a starting clutch (24) that transmits an engine driving force to a downstream side when an engine rotation speed becomes a predetermined value (Ne2) or higher, a change clutch (51) on the downstream side of the starting clutch (24), a stepped transmission (50) having a main shaft (56) to which rotation of the change clutch (51) is transmitted and a countershaft (57), and a single spindle (71) that operates the change clutch (51) and the transmission (50). The vehicle further includes a gear position sensor (63a) that detects a shift stage of the transmission (50), an actuator (70) that drives the spindle (71), and a transmission control system (17) that operates the actuator (70). Specifically, when the engine (21) is started in a state in which the transmission (50) is in second gear or higher, the actuator (70) is driven to carry out shift-down operation and output of the engine (21) is limited to a value smaller than the predetermined value (Ne2) until a gear position of the transmission (50) is set neutral or first.

According to the embodiment of the present invention, when the engine is started in the state in which the transmission is in second gear or higher, the actuator is driven and the shift-down operation is carried out. In addition, the output of the engine is limited to a value smaller than the predetermined value, at which transmission of the driving force by the starting clutch is started. Therefore, the transmission of the driving force by the starting clutch is not carried out until the gear position is shifted down to neutral or first. This can prevent application of the driving force to the starting clutch in the state with a high gear position and prevent the occurrence of sluggish starting and the swing of the driving force in association with the disconnection and connection of the clutch.

Furthermore, the embodiment of the present invention is characterized in that the vehicle includes a throttle position sensor (134) that detects a throttle opening of an intake pipe (25) of the engine (21) or a rotation speed sensor (45) that detects the engine rotation speed, and engine torque-down control is carried out if the throttle opening or the engine rotation speed reaches a throttle opening threshold (TH1) or a rotation speed threshold (TH2).

According to the embodiment of the present invention, the output of the engine is reduced only when the throttle opening or the engine rotation speed reaches the throttle opening threshold or the rotation speed threshold and the vehicle becomes the state in which the engine torque-down control is necessary. Therefore, the output of the engine is not reduced in the other states. Thus, the gear position can be shifted down to neutral or first with ensuring of favorable starting performance and warm-up performance of the engine.

Furthermore, the embodiment of the present invention is characterized in the following configuration in a transmission system of a vehicle including a power unit (16) having an engine (21), a starting clutch (24) that transmits an engine driving force to a downstream side when an engine rotation speed becomes a predetermined value (Ne2) or higher, a change clutch (51) on the downstream side of the starting clutch (24), a stepped transmission (50) having a main shaft (56) to which rotation of the change clutch (51) is transmitted and a countershaft (57), and a single spindle (71) that operates the change clutch (51) and the transmission (50). The vehicle further includes a gear position sensor (63a) that detects a shift stage of the transmission (50), an actuator (70) that drives the spindle (71), a transmission control system (17) that operates the actuator (70), and a throttle position sensor (134) that detects a throttle opening of an intake pipe (25) of the engine (21) or a rotation speed sensor (45) that detects the engine rotation speed. Specifically, when the engine (21) is started in a state in which the transmission (50) is in second gear or higher, the actuator (70) is driven to carry out shift-down operation if the throttle opening or the engine rotation speed does not reach a throttle opening threshold (TH1) or a rotation speed threshold (TH2), and engine torque-down control to limit output of the engine (21) to a value smaller than the predetermined value (Ne2) is carried out if the throttle opening or the engine rotation speed reaches the throttle opening threshold (TH1) or the rotation speed threshold (TH2). Furthermore, in a period of engine torque-down by the engine torque-down control, shift-down is continued if the spindle (71) is currently rotating due to shift-down operation, and shift-down is prohibited if shift-down operation is not currently being carried out.

According to the embodiment of the present invention, if the throttle opening or the engine rotation speed reaches the throttle opening threshold or the rotation speed threshold for any reason, the engine torque-down control is carried out and shift-down is prohibited if shift-down operation is not currently being carried out. This can prevent the disconnection and connection of the change clutch in association with the shift-down operation in the state in which the output of the engine is high. Furthermore, in the case in which the engine torque-down control is carried out, if shift-down operation is currently being carried out, only this shift-down operation is continued. Thus, the number of times of the disconnection and connection of the change clutch is suppressed to only one. Therefore, the occurrence of sluggish starting and the swing of the driving force in association with the disconnection and connection of the clutch can be prevented.

In the transmission system of a vehicle according to the embodiment of the present invention, it is possible to prevent application of the driving force to the starting clutch in the state with a high gear position and prevent the occurrence of sluggish starting and the swing of the driving force in association with the disconnection and connection of the clutch.

Furthermore, the gear position can be shifted down to neutral or first with ensuring of favorable starting performance and warm-up performance of the engine.

Moreover, it is possible to prevent the disconnection and connection of the change clutch in association with the shift-down operation in the state in which the output of the engine is high.

Obviously, numerous modifications and variations of the present invention are possible in light of the above teachings. It is therefore to be understood that within the scope of the appended claims, the invention may be practiced otherwise than as specifically described herein.

What is claimed is:

1. A transmission system of a vehicle including a power unit having an engine, a starting clutch that transmits an engine driving force to a downstream side when an engine rotation speed becomes a predetermined value or higher, a change clutch on the downstream side of the starting clutch, a stepped transmission having a main shaft to which rotation of the change clutch is transmitted and a countershaft, and a single spindle that operates the change clutch and the transmission, the vehicle further including a gear position sensor that detects a shift stage of the transmission, an actuator that drives the spindle, and a transmission control system that operates the actuator, the transmission system being characterized in that
when the engine is started in a state in which the transmission is in second gear or higher, the actuator is driven to carry out shift-down operation upon starting of the engine and output of the engine is limited to a value smaller than the predetermined value until a gear position of the transmission is set neutral or first.

2. The transmission system of a vehicle according to claim 1, characterized in that the vehicle includes a throttle position sensor that detects a throttle opening of an intake pipe of the engine or a rotation speed sensor that detects the engine rotation speed, and engine torque-down control is carried out if the throttle opening or the engine rotation speed reaches a throttle opening threshold or a rotation speed threshold.

3. A transmission system of a vehicle including a power unit having an engine, a starting clutch that transmits an engine driving force to a downstream side when an engine rotation speed becomes a predetermined value or higher, a change clutch on the downstream side of the starting clutch, a stepped transmission having a main shaft to which rotation of the change clutch is transmitted and a countershaft, and a single spindle that operates the change clutch and the transmission, the vehicle further including a gear position sensor that detects a shift stage of the transmission, an actuator that drives the spindle, a transmission control system that operates the actuator, and a throttle position sensor that detects a throttle opening of an intake pipe of the engine or a rotation speed sensor that detects the engine rotation speed, the transmission system being characterized in that
when the engine is started in a state in which the transmission is in second gear or higher, the actuator is driven to carry out shift-down operation if the throttle opening or the engine rotation speed does not reach a throttle opening threshold or a rotation speed threshold, and engine torque-down control to limit output of the engine to a value smaller than the predetermined value is carried out if the throttle opening or the engine rotation speed reaches the throttle opening threshold or the rotation speed threshold, and
in a period of engine torque-down by the engine torque-down control, shift-down is continued if the spindle is currently rotating due to shift-down operation, and shift-down is prohibited if shift-down operation is not currently being carried out.

4. A transmission system of a vehicle, comprising:
a starting clutch to transmit an engine driving force from an engine to a downstream side in a case where an engine rotation speed of the engine becomes a predetermined value or higher;
a change clutch provided on the downstream side of the starting clutch;
a stepped transmission comprising:
a main shaft to which an engine driving force from the change clutch is transmitted; and
a countershaft to output an engine driving force from the main shaft;
a single spindle via which the change clutch and the stepped transmission are operated;
a gear position sensor to detect a shift stage of the stepped transmission;
an actuator to rotate the single spindle; and
a transmission controller, in a case where the engine is started in a state in which the shift stage of the stepped transmission is set in second gear or higher, configured to control the actuator to carry out shift-down operation upon starting of the engine and configured to limit output of the engine so that the engine rotation speed becomes a value smaller than the predetermined value until the shift stage of the stepped transmission is set in neutral or first gear.

5. The transmission system according to claim 4, further comprising:
a throttle position sensor to detect a throttle opening of an intake pipe of the engine or a rotation speed sensor to detect the engine rotation speed,
wherein the transmission controller is configured to carry out engine torque-down control if the throttle opening or the engine rotation speed reaches a throttle opening threshold or a rotation speed threshold.

6. A transmission system of a vehicle, comprising:
a starting clutch to transmit an engine driving force from an engine to a downstream side in a case where an engine rotation speed of the engine becomes a predetermined value or higher;
a change clutch provided on the downstream side of the starting clutch;
a stepped transmission comprising:
  a main shaft to which an engine driving force from the change clutch is transmitted; and
  a countershaft to output an engine driving force from the main shaft;
a single spindle via which the change clutch and the stepped transmission are operated;
a gear position sensor to detect a shift stage of the stepped transmission;
an actuator to rotate the single spindle;
a throttle position sensor to detect a throttle opening of an intake pipe of the engine or a rotation speed sensor to detect the engine rotation speed;
a transmission controller, in a case where the engine is started in a state in which the shift stage of the stepped transmission is set in second gear or higher, configured to control the actuator to carry out shift-down operation if the throttle opening or the engine rotation speed does not reach a throttle opening threshold or a rotation speed threshold and configured to carry out engine torque-down control to limit output of the engine so that the engine rotation speed becomes a value smaller than the predetermined value if the throttle opening or the engine rotation speed reaches the throttle opening threshold or the rotation speed threshold; and
the transmission controller, in a period of engine torque-down due to the engine torque-down control, configured to continue shift-down due to the shift-down operation if the single spindle is currently rotating due to the shift-down operation and configured to prohibit the shift-down if the shift-down operation is not currently being carried out.

7. A transmission system of a vehicle, comprising:
a starting clutch to transmit an engine driving force from an engine to a downstream side in a case where an engine rotation speed of the engine becomes a predetermined value or higher;
a change clutch provided on the downstream side of the starting clutch;
a stepped transmission comprising:
  a main shaft to which an engine driving force from the change clutch is transmitted; and
  a countershaft to output an engine driving force from the main shaft;
a single spindle via which the change clutch and the stepped transmission are operated;
a gear position sensor to detect a shift stage of the stepped transmission;
an actuator to rotate the single spindle; and
a transmission controller, in a case where the engine is started in a state in which the shift stage of the stepped transmission is set in second gear or higher, configured to control the actuator to carry out shift-down operation and configured to limit output of the engine so that the engine rotation speed becomes a value smaller than the predetermined value until the shift stage of the stepped transmission is set in neutral or first gear,
wherein the predetermined value is higher than an idling rotation speed of the engine.

8. A transmission system of a vehicle, comprising:
a starting clutch to transmit an engine driving force from an engine to a downstream side in a case where an engine rotation speed of the engine becomes a predetermined value or higher;
a change clutch provided on the downstream side of the starting clutch;
a stepped transmission comprising:
  a main shaft to which an engine driving force from the change clutch is transmitted; and
  a countershaft to output an engine driving force from the main shaft;
a single spindle via which the change clutch and the stepped transmission are operated;
a gear position sensor to detect a shift stage of the stepped transmission;
an actuator to rotate the single spindle;
a transmission controller, in a case where the engine is started in a state in which the shift stage of the stepped transmission is set in second gear or higher, configured to control the actuator to carry out shift-down operation and configured to limit output of the engine so that the engine rotation speed becomes a value smaller than the predetermined value until the shift stage of the stepped transmission is set in neutral or first gear; and
a throttle position sensor to detect a throttle opening of an intake pipe of the engine or a rotation speed sensor to detect the engine rotation speed,
wherein the transmission controller is configured to carry out engine torque-down control if the throttle opening or the engine rotation speed reaches a throttle opening threshold or a rotation speed threshold, and
wherein the throttle opening threshold is set to a throttle opening with which the engine rotation speed of the engine is higher than an idling rotation speed of the engine and is lower than the predetermined value or the rotation speed threshold is set to a rotation speed that is higher than the idling rotation speed of the engine and is lower than the predetermined value.

9. The transmission system according to claim 6, wherein the throttle opening threshold is set to a throttle opening with which the engine rotation speed of the engine is higher than an idling rotation speed of the engine and is lower than the predetermined value or the rotation speed threshold is set to a rotation speed that is higher than the idling rotation speed of the engine and is lower than the predetermined value.

* * * * *